(12) United States Patent
Kessler

(10) Patent No.: US 10,246,223 B2
(45) Date of Patent: Apr. 2, 2019

(54) BLOW MOLDED CONTAINER HAVING A PROTRUDING VIEW STRIPE

(71) Applicant: Kessler Containers, Ltd., St. Louis, MO (US)

(72) Inventor: Robert H. Kessler, Chesterfield, MO (US)

(73) Assignee: KESSLER CONTAINERS, LTD., St. Louis, MO (US)

( * ) Notice: Subject to any disclaimer, the term of this patent is extended or adjusted under 35 U.S.C. 154(b) by 650 days.

(21) Appl. No.: 14/448,013

(22) Filed: Jul. 31, 2014

(65) Prior Publication Data

US 2016/0031604 A1 Feb. 4, 2016

(51) Int. Cl.
| | | |
|---|---|---|
| *B65D 25/54* | (2006.01) | |
| *B65D 1/02* | (2006.01) | |
| *B29C 49/00* | (2006.01) | |
| *B29C 49/04* | (2006.01) | |
| *B29L 31/00* | (2006.01) | |

(52) U.S. Cl.
CPC .............. *B65D 25/54* (2013.01); *B29C 49/00* (2013.01); *B29C 49/04* (2013.01); *B65D 1/02* (2013.01); *B29K 2023/06* (2013.01); *B29L 2031/7158* (2013.01)

(58) Field of Classification Search
CPC .......... B65D 25/54; B65D 25/56; B65D 1/02; B65D 1/0246; A47J 31/4457
USPC .................. 220/662–664, 602; 206/776, 778
See application file for complete search history.

(56) References Cited

U.S. PATENT DOCUMENTS

| | | | |
|---|---|---|---|
| 1,203,448 A | 10/1916 | Ainsworth | |
| 1,434,948 A | 11/1922 | Gabris | |
| 3,217,923 A * | 11/1965 | Price | A47J 31/4457 220/663 |
| 3,343,568 A | 9/1967 | Branscum et al. | |
| 5,449,088 A * | 9/1995 | Howard | B65D 25/56 220/662 |
| 5,464,107 A | 11/1995 | Koeniger | |
| 6,070,753 A * | 6/2000 | Hirst | B65D 1/02 215/40 |
| 6,077,579 A | 6/2000 | De Laforcade | |
| 6,988,629 B2 | 1/2006 | Pedmo et al. | |
| 2009/0289072 A1 | 11/2009 | Jo | |

\* cited by examiner

*Primary Examiner* — Robert Poon
(74) *Attorney, Agent, or Firm* — Thompson Coburn LLP

(57) ABSTRACT

A monolithic blow molded container is configured to hold liquids. A majority portion of the container is opaque and the container has an upper opening configured and adapted to allow liquid to be dispensed from the cavity of the container. The container also has a vertically oriented viewing stripe that bulges outward from the majority portion of the container in a manner such that liquid in the container can be observed through the transparent viewing stripe from two opposite viewing angles.

11 Claims, 3 Drawing Sheets

BLOW MOLDED CONTAINER HAVING A PROTRUDING VIEW STRIPE

CROSS-REFERENCE TO RELATED APPLICATIONS

Not Applicable.

STATEMENT REGARDING FEDERALLY SPONSORED RESEARCH OR DEVELOPMENT

Not Applicable.

APPENDIX

Not Applicable.

BACKGROUND OF THE INVENTION

Field of the Invention

The present invention pertains to blow molded containers. More particularly, the present invention pertains to blow molded containers of the type that comprise a view stripe.

General Background

Most plastic liquid containers of the type used for storing, shipping, and dispensing liquids are blow molded. For example, trigger sprayer containers, quart size lubricant containers, and shampoo and personal health care containers, just to name a few, are typically blow molded. In many circumstances, it is desirable for the plastic of the container to be colored. For example, it may be desirable to color such containers for marking purposes, for identification purposes, for compliance purposes, or even for purposes of shielding ultraviolet or other light rays from degrading liquid contained in such containers. In some cases it is acceptable for such coloring to be transparent such that the liquid in such containers can be observed from outside the containers. However, often it is preferable that such coloring be opaque. As can be appreciated, opaque liquids containers suffer from a disadvantage in that the level of liquid in such containers cannot easily be determined from a distance.

In view of the foregoing, some blow molded containers are molded from both transparent plastic and opaque plastic in a manner such that the transparent plastic forms a vertical "view stripe" along one side of the container. Such view stripes allow the majority of such containers to be opaque while still allowing people to observe the levels of liquid in such containers by peering into the containers through the view stripes. However, in some circumstances such view stripes are difficult to use since often little light reflects back out of the containers through the view stripe. Additionally, such view stripes typically must be viewed perpendicularly to ascertain the level of liquids in such containers.

SUMMARY OF THE INVENTION

The present invention overcomes the disadvantages associated with view stripes on blow molded containers by forming a view stripe as a vertical transparent protrusion that protrudes from the adjacent opaque portions of the containers. The protrusion creates a liquid channel that is exterior to the volume bounded by the opaque portions of the container. Thus, the liquid level in the channel can be observed from multiple viewing angles, preferably even from opposite view angles, and light can pass through the protrusion and channel and be observed without having to be reflected back at the viewer.

In one aspect of the invention, a monolithic blow molded container has a top, a bottom, a front, a rear, and opposite sides. The container comprises a cavity that is configured and adapted to hold liquid. The top has an opening configured and adapted to allow liquid to be dispensed from the cavity of the container. The container has a horizontal perimeter and comprises an opaque wall portion and transparent wall portion. The opaque wall portion extends a majority of the way around the perimeter and bounds a main portion of the cavity. The transparent wall portion is vertically elongate and has a convex outer surface and a concave inner surface. The concave inner surface defines a vertically extending channel portion of the cavity that is external to the main portion of the cavity. The transparent wall portion protrudes from adjacent portions of the opaque wall portion of the container in a manner such that liquid in the channel portion of the cavity can be observed through the transparent wall portion from two opposite viewing angles.

In another aspect of the invention, a method comprises blow molding a container from a single parison in a manner such that the container is monolithic. The container has a top, a bottom, a front, a rear, and opposite sides. The container comprises a cavity that is configured and adapted to hold liquid. The top has an opening configured and adapted to allow liquid to be dispensed from the cavity of the container. The container has a horizontal perimeter and comprises an opaque wall portion and transparent wall portion. The opaque wall portion extends a majority of the way around the perimeter and bounds a main portion of the cavity. The transparent wall portion is vertically elongate and has a convex outer surface and a concave inner surface. The concave inner surface defines a vertically extending channel portion of the cavity that is external to the main portion of the cavity. The transparent wall portion protrudes from adjacent portions of the opaque wall portion of the container in a manner such that liquid in the channel portion of the cavity can be observed through the transparent wall portion from two opposite viewing angles.

In yet another aspect of the invention, a monolithic blow molded container is configured to hold liquids. A majority portion of the container is opaque and the container has an upper opening configured and adapted to allow liquid to be dispensed from the cavity of the container. The container also has a vertically oriented viewing stripe that bulges outward from the majority portion of the container in a manner such that liquid in the container can be observed through the transparent viewing stripe from two opposite viewing angles.

Further features and advantages of the present invention, as well as the operation of the invention, are described in detail below with reference to the accompanying drawings.

Figure 1:
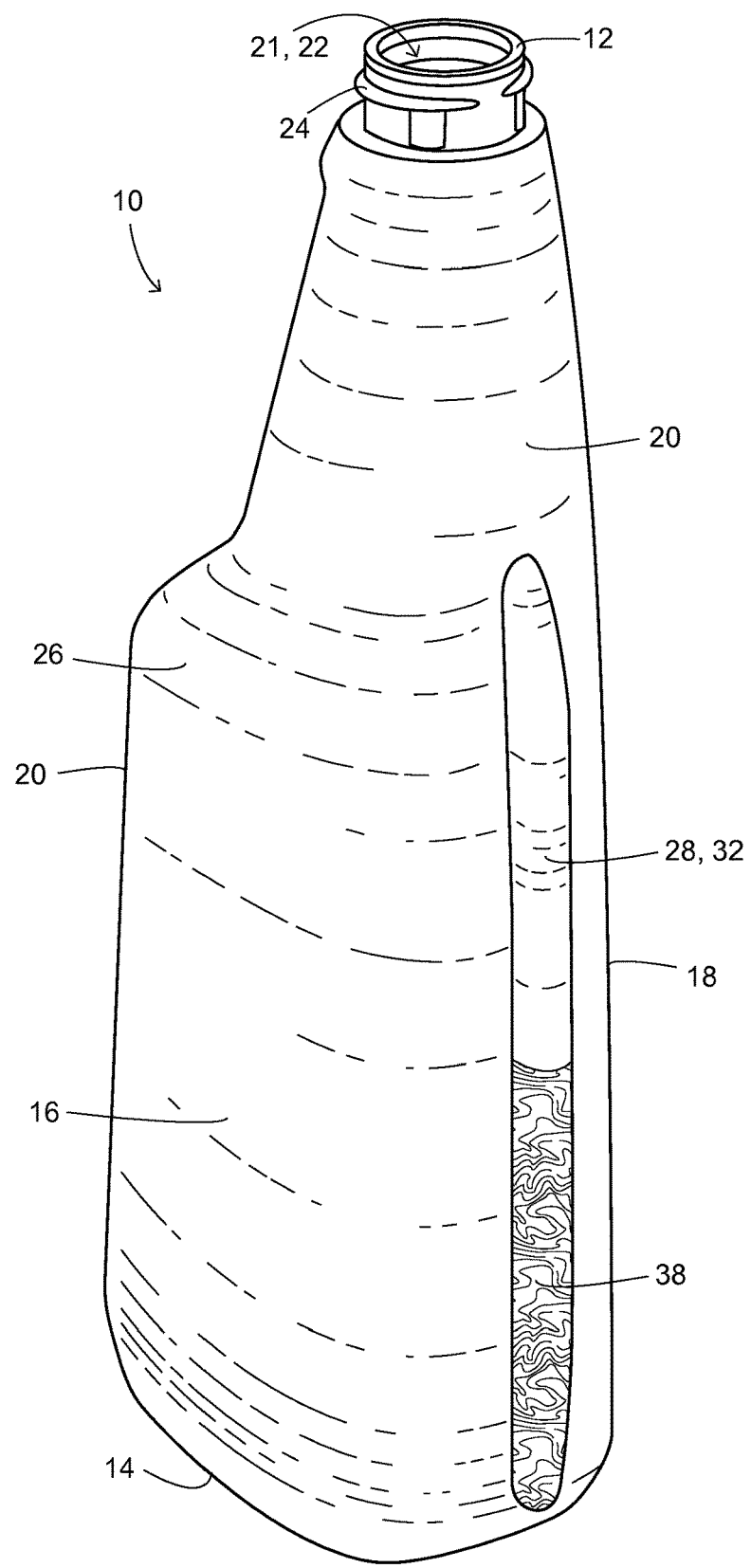
FIG. 1 is a perspective view of an embodiment of the invention having liquid therein.

Reference numerals in the written specification and in the drawing figures indicate corresponding items.

DETAILED DESCRIPTION

Figure 2:
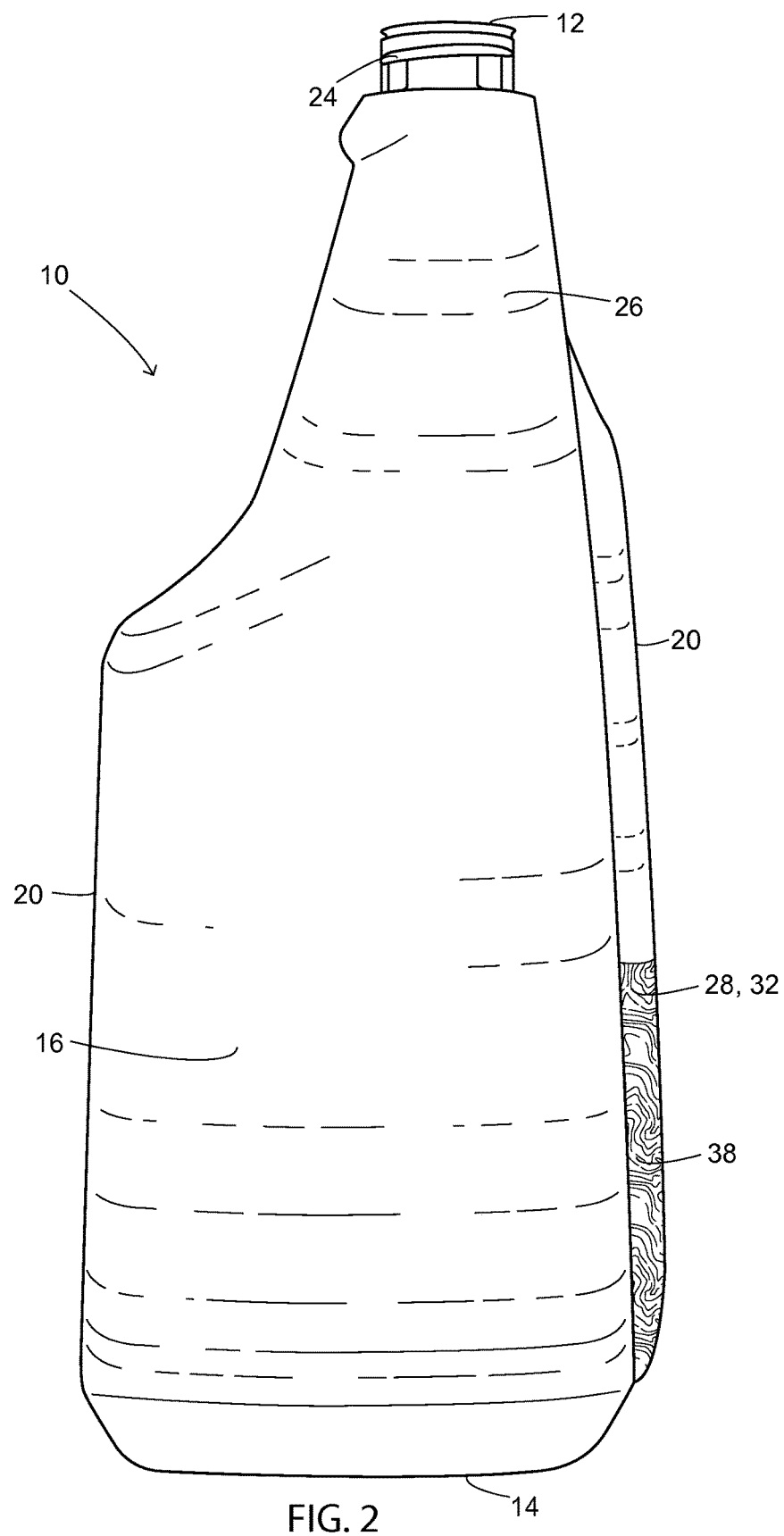
FIG. 2 is a front view of the embodiment of the invention shown in FIG. 1.
Figure 3:
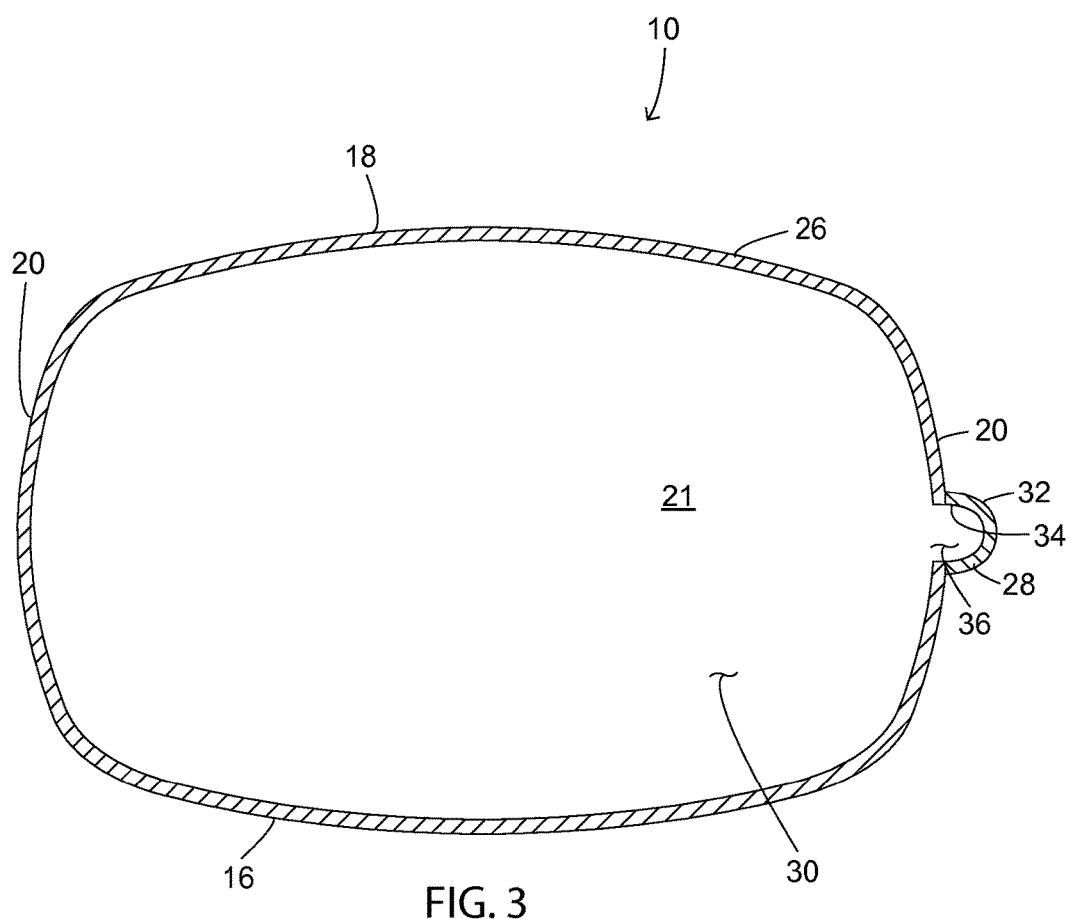
FIG. 3 is a horizontal cross-sectional view of the embodiment of the invention shown in FIGS. 1 and 2.

A blow molded container in accordance with the invention is shown in FIGS. 1-3. The container 10 has a top 12, a bottom 14, a front 16, a rear 18, and opposite sides 20 and comprises a cavity 21 that is configured and adapted to hold and dispense liquid. An opening 22 is formed in the top 12 of the container 10 for dispensing liquid from the cavity 21 of the container. Threads 24 are preferably formed around the opening 22 for receiving a cap or trigger sprayer (not shown). Alternatively, the container 10 could be provided with a bayonet style attachment portion or may be devoid of any type of cap or trigger sprayer attachment portion.

The container consists of an opaque wall portion 26 and a plastic transparent wall portion 28 that are integrally blow molded from a single plastic parison. The plastic may be any type of plastic, such as polyethelene. The opaque portion 12 forms a majority of the container 10 and bounds and defines a main portion 30 of the container's cavity 21. The transparent wall portion 28 is vertically elongate and has a convex outer surface 32 and a concave inner surface 34 as shown in the horizontal cross-section of the container of FIG. 3, which is a horizontal cross-section taken mid way up the height of the container 10. The concave inner surface 34 defines a vertically extending channel portion 36 of the cavity 21 that is external to the main portion 30 of the cavity but is fluidly connected thereto. The transparent wall portion 28 protrudes from adjacent portions of the opaque wall portion 26 of the container 10 in a manner such that liquid 38 in the channel portion 36 of the cavity 21 can be observed through the transparent wall portion from two opposite viewing angles (preferably from either the front 16 or rear 18 of the container 10). As such, the transparent wall portion 28 of the container 10 forms a protruding view stripe.

As shown in the figures, the front 16 and rear 18 of the container 10 may be symmetric. As is also shown in the figures, side-to-side 20, the container 10 may be non-symmetric. To the extent the container 10 is non-symmetric side-to-side 20, the top 12 and opening 22 of the container may be skewed to one side 20 of the container. If that is the case, transparent wall portion 28 of the container 10 is preferably formed on the side 20 of the container that is nearest the top 12 and opening 22 of the container. The transparent wall portion 28 of the container 10 also preferably extends up a majority of the height of the container. Preferably, transparent wall portion 28 of the container 10 begins slightly above the bottom 14 of the container and extends up toward the top 12 of the container, but stops short thereof.

It should be appreciated that the transparent wall portion 28 of the container 10 protrudes from adjacent portions of opaque wall portion 26 to a degree such that the channel portion 36 formed by the transparent wall portion also protrudes outwardly from the opaque wall portion 26 of the container. As such, the level of liquid 38 in the container 10 can be viewed from opposite viewing angles (e.g., from the front 16 and from the rear 18 of the container). It should also be appreciated that the transparent wall portion 28 of the container 10 may be translucent rather than totally clear. The transparent wall portion 28 of the container 10 may also be tinted any color. Preferably, the transparent wall portion 28 of the container 10 has a thickness that is the same or close to that of the opaque wall portion 26. For example, the thickness of the thinner of the transparent wall portion 28 and the opaque wall portion 26 of the container 10 is preferably within eighty percent or more of the thicker of the two. Preferably, the transparent wall portion 28 of the container abruptly protrudes from opaque wall portion 26 and the transitions between the opaque wall portion 26 of the container 10 and the transparent wall portion 28 are positioned at or close to where the abruptness occurs.

In view of the foregoing, it should be appreciated that the invention has several advantages over the prior art.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed, unless such and order is inherent.

What is claimed is:

1. A monolithic blow molded container having a top, a bottom, a front, a rear, and opposite sides, the container comprising a cavity that is configured and adapted to hold liquid, the top having an opening configured and adapted to allow liquid to be dispensed from the cavity of the container, the container having a horizontal perimeter and comprising an opaque wall portion and transparent wall portion, the opaque wall portion extending a majority of the way around the perimeter and bounding a main portion of the cavity, the transparent wall portion being vertically elongate and having a convex outer surface and a concave inner surface, the concave inner surface defining a vertically extending channel portion of the cavity that is external to the main portion of the cavity, the transparent wall portion protruding from adjacent portions of the opaque wall portion of the container in a manner such that liquid in the channel portion of the cavity can be observed through the transparent wall portion from two opposite viewing angles.

2. A container in accordance with claim 1 wherein the transparent wall portion and an adjacent portion of the opaque wall portion each have a thickness and the thicknesses are within eighty percent of each other.

3. A container in accordance with claim 2 wherein the transparent wall portion protrudes from adjacent portions of the opaque wall portion of the container in a manner such that the channel portion of the cavity protrudes away from the main portion of the cavity a distance of at least three times the thickness of the transparent wall portion.

4. A container in accordance with claim 1 wherein the container has a height defined by the maximum distance between the top and the bottom of the container and the transparent wall portion extends vertically a distance greater than one-half of the height of the container.

5. A container in accordance with claim 4 wherein the container tapers down and toward one of the sides of the container, and the transparent wall portion protrudes from adjacent portions of the opaque wall portion of the container on the one side of the container.

6. A container in accordance with claim 5 wherein the container has a width defined by the maximum distance between the opposite sides of the container and a depth defined by the maximum distance between the front and rear of the container, the height of the container is greater than the width of the container, and the width is greater than the depth of the container.

7. A container in accordance with claim 1 wherein the transparent wall portion extends only along one of the front, rear, and opposite sides of the container, and the transparent wall portion is translucent such that light gets diffused when passing through the transparent wall portion.

8. A monolithic blow molded container configured to hold liquids, a majority portion of the container being opaque, the container having an upper opening configured and adapted to allow liquid to be dispensed from the cavity of the container, the container also having a vertically oriented viewing stripe that bulges outward from the majority portion of the container in a manner such that liquid in the container can be observed through the transparent viewing stripe from two opposite viewing angles.

9. A container in accordance with claim 8 wherein the container consists only of the majority portion and the viewing stripe.

10. A container in accordance with claim 8 wherein the view stripe is translucent such that light gets diffused when passing through the view stripe.

11. A container in accordance with claim 8 wherein the view stripe has a semicircular horizontal cross-section.

* * * * *